United States Patent [19]

Kato

[11] Patent Number: 4,801,948

[45] Date of Patent: Jan. 31, 1989

[54] THERMAL RECORDING APPARATUS WITH RESISTANCE COMPENSATION

[75] Inventor: Nobuhisa Kato, Kanagawa, Japan

[73] Assignee: Fuji Xerox Co., Ltd., Tokyo, Japan

[21] Appl. No.: 44,003

[22] Filed: Apr. 29, 1987

[30] Foreign Application Priority Data

Apr. 30, 1986 [JP] Japan .................................. 61-98250

[51] Int. Cl.[4] .............................................. G01D 15/10

[52] U.S. Cl. ................................ 346/76 PH; 400/120; 358/298

[58] Field of Search .................. 346/76 PH, 70 R, 1.1; 219/216, 216 PH; 400/120, 120 PH

[56] References Cited

U.S. PATENT DOCUMENTS 4,540,991 9/1985 Kariya et al. .................. 346/76 PH

FOREIGN PATENT DOCUMENTS 0078769 5/1985 Japan .............................. 346/76 PH 0087071 5/1985 Japan ............................. 400/120 PH 0143980 7/1985 Japan ............................. 400/120 PH 0217175 10/1985 Japan ............................. 400/120 PH

*Primary Examiner*—E. A. Goldberg

*Assistant Examiner*—Huan H. Tran

*Attorney, Agent, or Firm*—Finnegan, Henderson, Farabow, Garrett, & Dunner

[57] ABSTRACT

A thermal recording apparatus includes a resistance memory for storing resistance variation data associated with each of a plurality of resistive thermal recording elements. A picture element stores gradation data representing a plurality of picture elements to be recorded to reproduce a picture image. A gradation conversion mechanism receiving the stored gradation data and the stored resistance variation data associated with the recording elements to record the gradation data and corrects the values of the gradation data to compensate for the variations in the resistances of the recording elements from a predetermined value.

3 Claims, 4 Drawing Sheets

THERMAL RECORDING APPARATUS WITH RESISTANCE COMPENSATION

FIELD OF THE INVENTION

The present invention relates to a thermal recording apparatus for recording data using a recording head, and more particularly to a thermal recording apparatus capable of recording thermally with high contrast by correcting variations in resistance of heating elements used to form an image.

Application Ser. No. 07/044002, filed on 04/29/1987 herewith by the present inventor and entitled "Thermal Printing Device" is hereby incorporated by reference.

BACKGROUND OF THE INVENTION

Facsimile machines and printers commonly use thermal recording devices that record data by means of thermosensitive paper and transfer type thermosensitive recording media. In such a recording apparatus, a thermal recording head with heating elements arranged in a row is normally used. The thermal head produces thermal energy during recording and the image quality may deteriorate because of the cumulative heat. One of the primary factors causing image deterioration is the fact that the resistances of the heating elements differ from one another.

The variations in resistance are mainly attributed to the process of manufacturing the heating elements and may be roughly classified into two categories. The first cause is that the heating elements in the thermal head vary in resistance, and the other cause is that mean resistance of the heating elements in one thermal head differs from that in a different head. Moreover, the variations in resistance may be large in some cases; e.g., about ±25% in the first case and within the range of 200-300 ohms (AC) in the second case.

In a recording head whose heating elements have resistances that are different from one another, the printing density will be uneven even if the same amount of energy is applied to each element. The variation in printing density makes desired gradations in printed images difficult to reproduce with precision. This problem is even more serious in a color data recording apparatus required to record with several colors. If the heating elements have resistances that are different from one another, tone reproducibility is erratic and the quality of a recording deteriorates seriously.

OBJECTS AND SUMMARY OF THE INVENTION

An object of the present invention is to provide a thermal recording apparatus capable of recording accurate and distinct gradations.

Another object of the present invention is a thermal recording apparatus capable of good tone reproducibility.

A further object of the present invention is a thermal recording apparatus capable of compensating for irregularities in the resistance values of heating elements.

These and other objects are attained by a thermal recording apparatus adapted to control the calorific value of each of a plurality of resistive heating elements constituting a printing head to record visible images of an image signal including a series of picture elements having density gradations, the apparatus comprising first means for storing resistance variation data associated with each of the resistive heating elements to indicate the variance of the resistance of the associated heating element from a predetermined value, second means for storing gradation values associated with each of the picture elements, each of the gradation values indicating the density of an image to be recorded by a corresponding one of the heating elements, and gradation correction means coupled to the first and second storing means for adjusting the values of the gradation values in accordance with the resistance variation data associated with the picture elements to be recorded by the heating elements to maintain a uniform calorific value for each of the resistive heating element regardless of variance in the resistances thereof from the predetermined resistance value.

BRIEF DESCRIPTION OF THE DRAWINGS

The manner by which the above objects and other objects, features, and advantages of the present invention are attained will be fully apparent in view of the accompanying drawings, wherein.

DETAILED DESCRIPTION OF THE INVENTION

Figure 1:
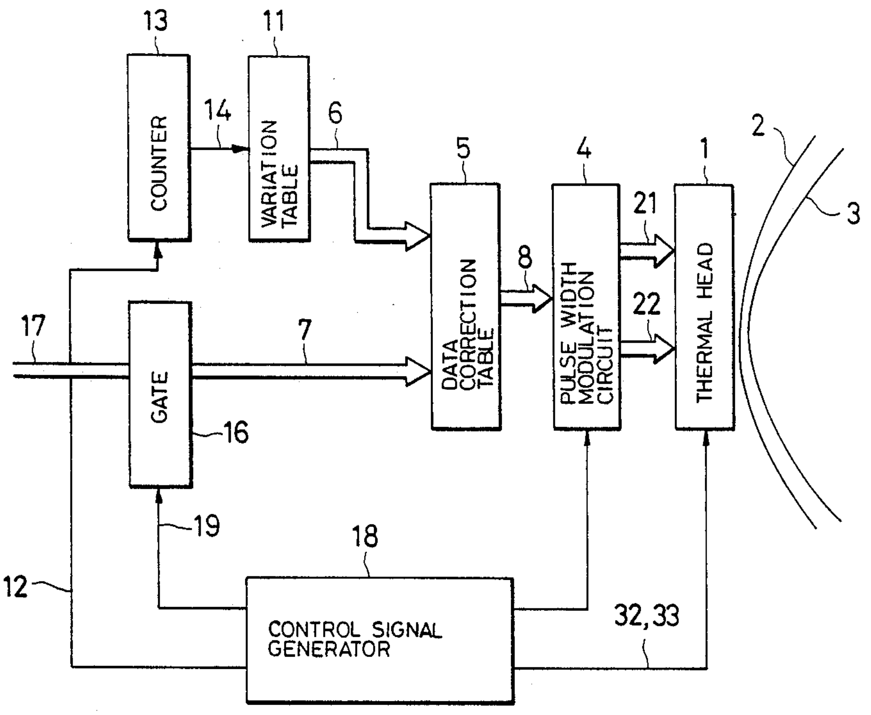
FIG. 1 is a block diagram showing the principal part of a thermal recording apparatus according to the present invention.

FIG. 1 is a block diagram showing the principal part of a thermal recording apparatus according to the present invention. A thermal head 1 used in the aforesaid thermal recording apparatus is formed with a thick film type heating resistor (not shown) built on a base. A number of comb-like lead electrodes are connected to the heating resistor and are selectively supplied with voltage pulses, whereby heating elements are formed by dividing the lead electrodes and are selectively supplied with power to establish heating control.

In this thermal recording apparatus, a thermal sublimating ink donor film (thermal recording medium) 2 is made to slidably contact the thermal head 1 and ink is consequently transferred to a recording paper (ordinary paper) 3 superposed on the film to provide visible image data. The expression of multistage gradations representing picture elements becomes possible because the quantity of ink to be transferred from the thermal sublimating ink donor film 2 can be changed continuously depending on the energy selectively applied to the heating elements.

In this embodiment, the energy is controlled on a heating element basis by modulating the time width (pulse width) of the pulses applied to each heating element. A pulse width modulation circuit 4 is provided for the aforesaid purpose.

A data correction table 5 is arranged in a stage preceding the pulse width modulation circuit 4 and corrects the gradation of each item of image data supplied to the thermal recording apparatus on a picture element basis. The data correction table 5 may be formed with a ROM (Read Only Memory) and, according to address data which is the combination of high order address data 6 and low order address data 7, outputs an image signal 8 with the corrected gradation. The high order address data 6 is produced by a variation table 11 and is used to correct the gradations in consideration of the actual resistance of each heating element.

The variation table 11 is formed with a non-volatile memory or otherwise may be formed with a RAM. In the case of the latter, the contents of the table can be updated by providing a circuit for measuring the actual resistance of each heating element in the apparatus to verify the resistances at all times. If a non-volatile memory is used, the apparatus can be simple in construction and the contents may be written into the memory during manufacture.

The variation table 11 is supplied by a counter 13 with a counting output for sequentialy counting image signal transfer clock signals from the head of each line and producing data as to the resistance of each heating element as high order address data.

The low order address date 7 comprises an image signal 17 transferred via a gate 16. The switching operation of the gate 16 is controlled by a gate control signal 19 produced by a control signal generator 18 and the gate 16 supplies the low order address data 7 representing the gradation of each picture element synchronously with the high order address data 6 to the data correction table 5.

More specifically, on receiving the picture elements forming the image signal 17, the thermal recording apparatus accesses correction data for each heating element to be energized to represent the picture elements by using the counter 13 and supplies the correction data as the high order address data 6 to the data correction table 5. The apparatus determines corrected gradations for recording picture elements by means of the gradation data correction table 5. The pulse width modulation circuit 4 prepares a binary image signal 21 indicating the presence of printing operation and a printing pulse signal 22 representing the time width of the printing pulse and supplies the signals to the thermal head 1, whereby the gradations are recorded on a line-by-line basis.

Figure 2:
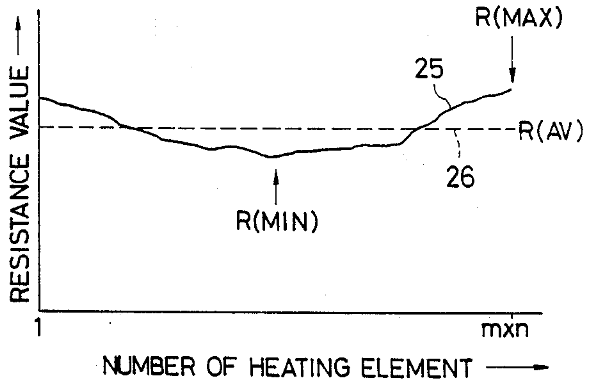
FIG. 2 is a characteristic diagram showing the results of measurements of the resistances of heating elements of a thermal recording head.

A continuous line 25 in FIG. 2 represents the measured resistances of the heating elements of the thermal head 1. The thermal head is equipped with an $m \times n$ array of heating elements and, from one end to the other, numbers starting with 1 up to $m \times n$ are given to the heating elements. The number may also be sequentially assigned in accordance to what elements are operated first or in the order that the image signal is processed, i.e., when the operation of the thermal head is divided into a plurality of operating times.

The value, R(MIN), in FIG. 2 represents the minimum resistance value of the heating elements, whereas the value, R(MAX), represents the maximum resistance value thereof. A broken line 26 represents the mean value, R(AV), of the resistances. The individual resistance of each heating element may be expressed by the value itself, a quantitive value, or a deviation from the mean value, R(AV).

Figure 3:
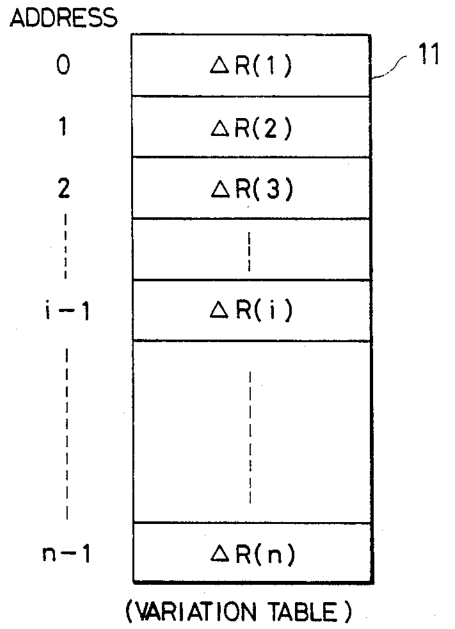
FIG. 3 is a structural diagram of a variation table for use in compensating for variations in the resistances of heating elements in a thermal recording head.

FIG. 3 shows the structure of the variation table 11 showing the deviation of the resistance of each heating element. Variation data $\Delta R(1)$ relating to the first heating element shown in FIG. 2 is written to address zero of the variation table 11 and variation data $\Delta R(2)$ relating to the second heating element is written to address one thereof. The same process is applied henceforward.

Variation data $\Delta R(i)$ relating to the i-th heating element (i being an integer and $1 \leqq i \leqq m \times N$) can be expressed by the following equation 1.

$$\Delta R(i) = [\{R(i) - R(\text{MIN})\}/R(\text{MAX}) - R(\text{MIN})] \times 255 \quad (1)$$

Figure 4:
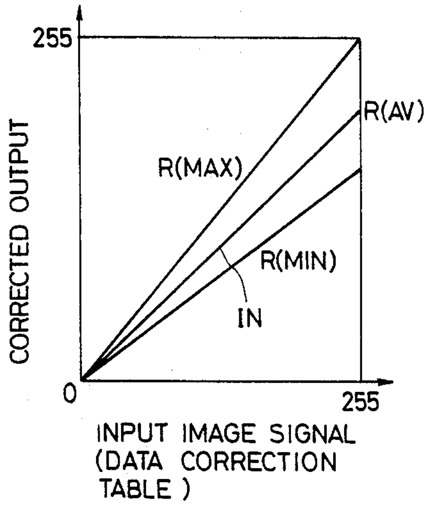
FIG. 4 is a diagram descriptive of a data correction table used in the present invention.

FIG. 4 shows the contents of the data correction table 5 for receiving the high order address data 6 as the output of the variation table and the low order address data 7 as the output of the gate 16 as described in reference to FIG. 1. The low order address data is an input image signal prior to conversion and, in the present embodiment, the picture elements starting with "0" up to "255" represent gradations in 256 stages. The abscissa axis in FIG. 4 represents the gradation level of the input image signal.

On the other hand, the ordinate axis in FIG. 4 designates the image signal 8 corrected and produced by the data correction table 5, i.e., a corrected output. The corrected output with the corrected gradation is determined depending on the relationship of the resistance of the heating element to the maximum value, R(MAX), and the minimum value, R(MIN). In the portion where the resistances of the heating elements are great, assuming the voltage applied to each heating element is constant, the calorific value per unit time decreases. Accordingly, the correction is so arranged that the greater the resistance of the heating element is, the greater the corrected output thereof becomes. When the input image signal designates the maximum gradation level "255", the corrected output corresponding to the maximum value, R(MAX), of the resistance of the heating element coincides with the maximum gradation level "255".

Given the image signal 8, the corrected output, $\Delta$OUT, can be expressed by the following equation 2:

$$\Delta \text{OUT} = [\Delta R(i) - IN]/255, \quad (2)$$

The reference code IN designates an input image signal level and it exists on the straight line representing the means value R(AV) of the resistances in FIG. 4.

Figure 5:
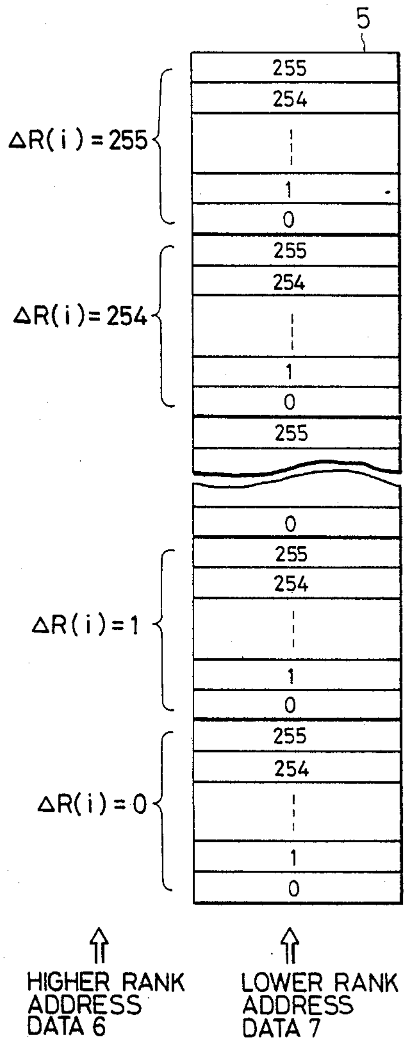
FIG. 5 is a structural diagram of the above data correction table of FIG. 4.

FIG. 5 shows an example of the structure of the data correction table. The data correction table 5 is used to retrieve the image signal with the gradation corrected by the low order address data 7 in 256 stages as in the cases of the high order address data obtained by converting the variation data $\Delta R(i)$ into the 256 stages.

The images signal 8 produced by the data correction table 5 is supplied to the pulse width modulation circuit 4 and is converted into a pulse width corresponding to the gradation. More specifically, the application pulse amounting to one raster is composed of a plurality of unit pulses and, by individually selecting the number of unit pulses applied to the heating elements, each gradation may be expressed. The correction of each gradation corresponding to the variation from mean resistance can be implemented by correspondingly adjusting the voltage of the pulse applied to the thermal head 1.

Figure 6:
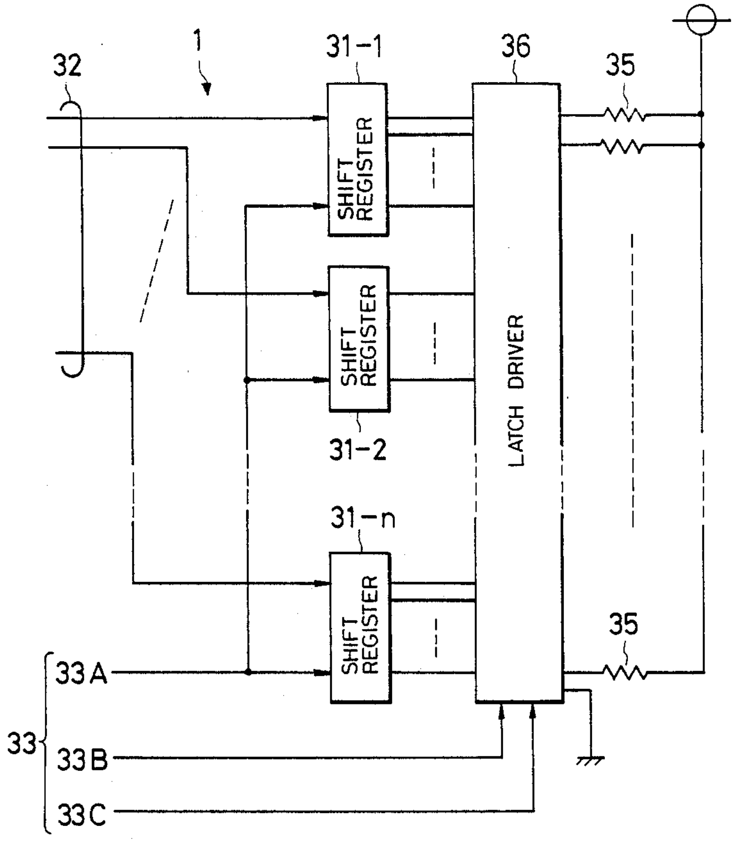
FIG. 6 is a circuit diagram showing an arrangement of a thermal head for use in the apparatus of FIG. 1.
Figure 7:
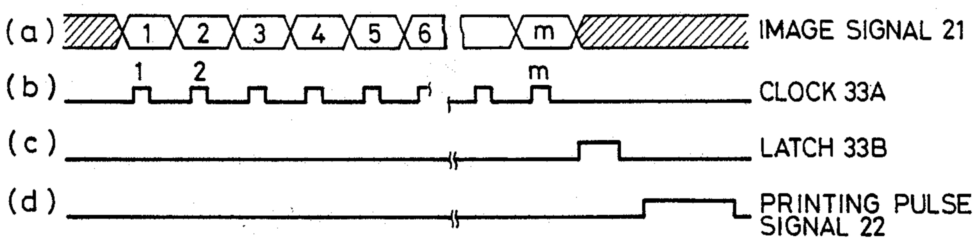
FIG. 7 is a timing chart showing the operation of the thermal head of FIG. 6.

FIG. 6 shows an example of the construction of the thermal head controlled in accordance with the present invention, and FIG. 7 refers to the operation of the thermal head. As shown in FIG. 6, n shift registers 31-1 through **31-*n* are arranged in systems in the thermal head 1, so that selected data 32 is supplied by the control signal generator 18 of FIG. 1 on a system basis. A clock signal 33**A (FIG. 7*b*) is supplied by the control signal generator 18 to the shift registers 31-1 through **31-*n* and the binary image signal 21** (FIG. 7*a*) is supplied on a bit-by-bit basis synchronously with the clock signal. The binary image signals 21 amounting to the number m obtained by dividing the total number of heating elements included in the m×n array of heating elements of the thermal head 1 by the number, n, of systems are set in the shift registers 31-1 through **31-*n*, respectively. The binary image signals 21 are caused to undergo serial-parallel conversion and are supplied to a latch driver 36**.

The latch driver 36 latches the data by means of a latch signal 33B (FIG. 7*c*) supplied by the control signal generator 18 and controls the supply of power to each heating element 35 with the time width being determined by the printing pulse signal 22 (FIG. 7*d*). That is, power is supplied, with the predetermined time width, to only the heating element 35 whose image signal is "1" and the electrical energy is converted into thermal energy.

One application of thermal energy is thus made and the data directed to the latch driver 36 is replaced a maximum of 256 times and the same operation is repeated, so that a recording operation equivalent to one raster is performed.

Each heating element 35 of the thermal head 1 is thus supplied with a series of voltage pulses having a cumulative pulse width corresponding to the gradation of the picture element to be made by the heating element. If the heating element slidably contacts the base layer side of the ink donor film 2 (thermal recording medium coated with heat sublimating ink) and the time width of the cumulative pulse composed of a number of pulses ranges from, e.g., 3 ms to 5 ms, in accordance with the heating element, ink corresponding to the quantity of thermal energy is transferred to the recording paper 3 that is superposed on the ink donor film. Consequently, the recording of a gradation by a correspondingly sized dot becomes possible.

If different types of thermal recording media are used or if the recording methods are different, the finish or visual appearance of the recorded images will slightly differ even though the thermal head 1 is operated in the same way. Accordingly, the image signal 17 representing the gradation may also be corrected before being supplied to the thermal recording elements 35 and the data correction table 5 is independently used to provide the correction. When the number of possible input gradations is different from the number of possible output gradations, the data correction table 5 is also used for making an appropriate adjustment.

Figure 8:
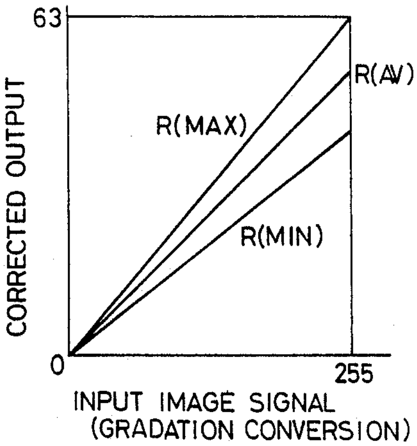
FIG. 8 is a graphical illustration of a data correction table for gradation conversion.

FIG. 8 shows the linear relationship between the input and output in terms of gradation conversion when the input gradation data is expressed by a full 8 bits capable of representing 256 gradations and the output data is expressed by only 64 gradation. In this case, a change of one gradation on the output side is made for every four gradation changes on the input side.

Figure 9:
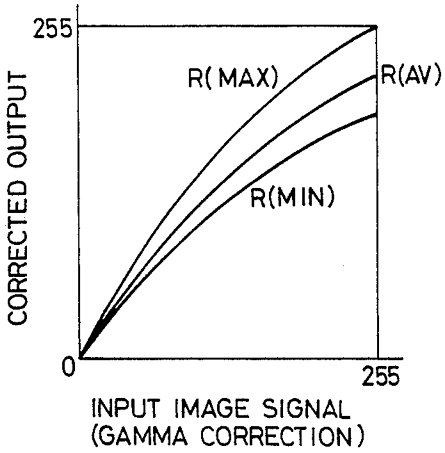
FIG. 9 is a graphical illustration of a data correction table for gamma correction.
Figure 10:
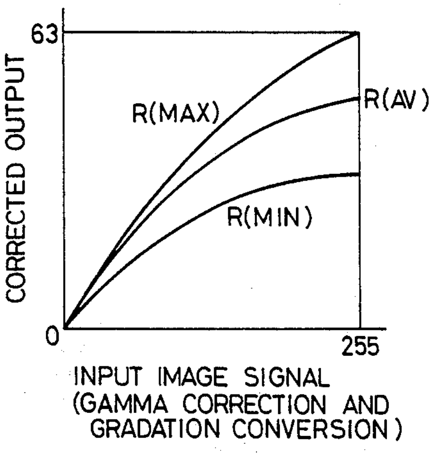
FIG. 10 is a graphical illustration of a data correction table for both gamma correction and gradation conversion.

On the other hand, FIG. 9 shows an example of gamma correction, wherein the gradation is non-linearly corrected to compensate for the properties of the thermal recording medium. The correcting curve is dependent on the properties of the thermal recording medium. Moreover, FIG. 10 shows an example of gamma correction that is applied simultaneously with gradation conversion table 5. In this example, the gamma correction shown in FIG. 9 is carried out during the process of converting the input picture elements expressed in 256 gradations into output picture elements expressed in 64 gradations.

The data correction table 5 and variation table 11 are not only usable for correcting variations in the resistances of the heating elements but also in adjusting the number of gradations and the transition of gradation to a desired gradation. The data correction data 5 may be unalterably stored in a ROM (Read Only Memory) or in a RAM where the contents are alterable by the user. Needless to say, a plurality of data correction tables 5 may be prepared, and be properly selected according to the user's preference or depending on the characterization of the image data.

Although a description has been given of the thermal recording apparatus using heat sublimating ink donor film, the present invention is also applicable to a thermal recording apparatus employing thermal recording paper for color recording or another reproducing medium with variable contrast through the control of thermal energy. In the aforesaid embodiments, reference has been made to the thick film type thermal head although the present invention is also applicable to a thin film type thermal head.

According to the present invention, gradation correcting means such as the data correction table 5 and the variation table 11 are provided to correct variations in the resistances of heating elements, whereby the expression of gradation can be freely changed by altering the contents of the gradation correcting means. Moreover, the advantage is that the aforesaid alterations can be made simply by replacing the ROM or by operating a switch.

What is claimed is:

1. A thermal recording apparatus adapted to control the calorific value of each of a plurality of resistive heating elements constituting a printing head, each resistive heating element acting to record one of a series of picture elements constituting an image signal and having a gradation value, the apparatus comprising:

first means for storing, for each of said resistive heating elements, one of a plurality of resistive variation data values to indicate a variance of the resistance of said heating element from a predetermined resistance value;

second means for storing a plurality of sets of gradation values, each of said plurality of sets of gradation values being associated with one of said plurality of resistance variation data values, each of said sets of gradation values containing possible gradation values of a picture element to be recorded by a resistive heating element having a resistance variation data value associated with said set; and gradation correction means coupled to said first and second storing means for adjusting said gradation values of each of said picture elements in accordance with said resistance variation data value of said resistive heating element acting to record said picture element and said gradation value of said picture element to be recorded, to maintain a uniform calorific value for each of the resistive heating elements regardless of variances in the resistance thereof from said predetermined resistance value.

2. The thermal recording apparatus of claim 1 wherein said second means stores a plurality of sets of gradation values, said sets reflecting a gamma correction curve wherein the gradation values are non-linearly related to the associated resistance variation data values.

3. The thermal recording apparatus of claim 1, wherein said picture element gradation values are input gradation values, said input gradation values being organized into a plurality of groups, and wherein said plurality of sets of stored gradation values are output values, each of said output values being associated with one of said plurality of groups, and wherein each of said plurality of sets of output values contain a lesser number of gradation values than the number of input gradation values.

* * * * *